(12) United States Patent
Carrier et al.

(10) Patent No.: US 8,078,529 B1
(45) Date of Patent: Dec. 13, 2011

(54) EVALUATING CUSTOMERS' ABILITY TO MANAGE REVOLVING CREDIT

(75) Inventors: Nancy T. Carrier, Jacksonville, FL (US); David Joffe, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 422 days.

(21) Appl. No.: 12/473,635

(22) Filed: May 28, 2009

(51) Int. Cl.
*G06Q 40/00* (2006.01)
(52) U.S. Cl. ............................................. 705/38; 705/35
(58) Field of Classification Search ................ 705/35–45
See application file for complete search history.

(56) References Cited

U.S. PATENT DOCUMENTS

2006/0097036 A1* 5/2006 Koenigsman et al. ........ 235/379

OTHER PUBLICATIONS

U.S. Appl. No. 12/486,464, filed Jun. 17, 2009.
U.S. Appl. No. 12/705,770, filed Feb. 15, 2010.

* cited by examiner

*Primary Examiner* — Shahid Merchant
*Assistant Examiner* — Stephanie M Ziegle
(74) *Attorney, Agent, or Firm* — Moore & Van Allen PLLC; W. Kevin Ransom

(57) ABSTRACT

Embodiments of the present invention relate to systems, methods and computer program products for evaluating customers' ability to manage revolving credit. To do so, for example, embodiments of the present invention review aggregated transaction data taken from a large number of revolving-credit accounts, and detect credit-usage patterns at an account level. The detected credit-usage patterns are then applied in risk models to evaluate individual customers' ability to manage revolving credit.

26 Claims, 4 Drawing Sheets

EVALUATING CUSTOMERS' ABILITY TO MANAGE REVOLVING CREDIT

FIELD

In general, embodiments of the present invention relate to systems, methods and computer program products for evaluating customers' ability to manage revolving credit.

BACKGROUND

Financial institutions commonly apply algorithms across vast amounts of transaction data to identify large-scale customer-behavior patterns. Then, applying these large-scale customer-behavior patterns in models, financial institutions identify opportunities to interact with customers, as a whole, with more precision and at times that are more likely to produce positive results. However, these large-scale customer-behavior patterns are not useful for identifying opportunities to interact with customers at an account level.

Although known pattern-detection techniques are effective for detecting large-scale customer-behavior patterns in aggregated transaction data taken from a large number of customers, known pattern-detection techniques are ineffective for detecting customer-behavior patterns at an account level. This ineffectiveness is particularly true in the area of detecting customer-behavior patterns—at an account level—in aggregated transaction data taken from revolving-credit accounts, such as credit card accounts.

There are a number of reasons for this ineffectiveness. For example, when multiple customers' credit card spending and balance data are aggregated, patterns fail to emerge because the aggregated data is offsetting. That is, for each customer with high spend in a month, there's a customer with proportionately low spend in the same month. Likewise, for each customer with a high balance, there's a customer with a proportionately low balance. Accordingly, no patterns emerge because the average amount customers spend (e.g., charge to a credit card) in a month is essentially the same each month and the average balance (e.g., outstanding balance on a credit card) is the same each month.

However, common knowledge tells us—hidden in vast amounts of credit card spending and balance data—are subsets of individual customers whose credit card spending and balance fluctuate from month to month according to similar patterns. If identified, these patterns would reflect individual customers' decisions on how much to spend, and how much and when to payback. These patterns would be helpful when evaluating individual customers' ability to manage revolving credit. However, because of the reasons described above, known pattern-detection techniques are ineffective for detecting these patterns.

SUMMARY

Embodiments of the present invention relate to systems, methods and computer program products for evaluating customers' ability to manage revolving credit. To do so, for example, the present invention reviews aggregated transaction data taken from a large number of revolving-credit accounts, and detects credit-usage patterns at an individual customer level. The detected credit-usage patterns are then applied in models to evaluate an individual customer's ability to manage revolving credit.

A brief summary of an exemplary embodiment of the present invention will now be provided. According to this exemplary embodiment, the present invention reviews aggregated transaction data taken from a large number of revolving-credit accounts to identify individual accounts in which a "trigger spend" occurred. The term "trigger spend" as used in this example refers to a situation where a customer's purchases and/or cash advances (collectively referred to herein as "spend") in a single month exceeds a percentage of the customer's credit line. Specifically, for purposes of this example, a trigger spend represents a situation where a customer's spend in a signal month equals at least 20% of that customer's credit line (e.g., a trigger spend occurs when a customer having a $10,000 credit line spends $2,000 or more in a single month). The month in which a customer's trigger spend occurs is referred to herein as the customer's "trigger month."

For the accounts in which a trigger spend occurred, the present invention, according to this example, decouples the customers' transaction data from actual time. Then, the present invention aligns the transaction data relative to the customers' trigger months. For example, in the event a first customer's trigger month is April 2007 and a second customer's trigger month is February 2008, the present invention decouples both customers' transaction data from actual time. Then the present invention shifts both customers' transaction data so as to align April 2007 of the first customer's account with February 2008 of the second customer's account. Because the customers' transaction data is aligned relative to the trigger month—instead of actual time—patterns related to the customers' trigger spends can be identified, even if the patterns occur in different months. These patterns would be masked if the transaction data were aligned relative to actual time.

After aligning transaction data, the present invention, according to this example, performs time-series analyses on the aligned transaction data to detect customers' credit-usage patterns at an individual account level. For illustrative purposes, an exemplary time-series analysis will now be described. The present invention performs this exemplary time-series analysis to identify individual accounts that demonstrate a credit-usage pattern characterized by high spend in the trigger month, followed by increasing balance and decreasing spend in subsequent months. This particular credit-usage pattern indicates that a customer likely has low ability to manage its revolving credit.

According to this example, to identify accounts that demonstrate this credit-usage pattern, the present invention first identifies all accounts in which a trigger spend occurred, irrespective of when the trigger spend occurred. Then, for each identified account, this exemplary embodiment of the present invention compares the customer's spend in the trigger month to the customer's spend in subsequent months. Also, for each identified account, this exemplary embodiment of the present invention compares the customer's balance in the month immediately after the trigger month to the customer's balance in subsequent months. For example, if the trigger month is Month 0, then the customer's balance in Month 1 is compared to the customer's balance in Months 2, 3, 4, 5, 6, 7, etc. Continuing with this example, the accounts identified as demonstrating this credit-usage pattern includes accounts in which: (1) Month 0's spend is greater than 20% of the account's credit limit; (2) Month 7's balance is greater than Month 1's; and (3) Month 7's spend is less than Month 0's.

When an account is identified as an account that demonstrates this credit-usage pattern characterized by high spend in the trigger month followed by increasing balance and decreasing spend in subsequent months, the present invention—according to this example—places a variable in the identified account. This variable, which is referred to herein as the "credit-usage variable," indicates that the account's transaction data demonstrates this credit-usage pattern.

Financial institutions can use embodiments of the present invention to mitigate write-offs. For example, financial institutions can proactively work with customers whose accounts include a credit-usage variable and thereby prevent delinquencies and eventual write-offs. To do so, embodiments of the present invention incorporate accounts having the credit-usage variable into risk models that dictate how the financial institution should act on the account. For example, in one embodiment customers who have the credit-usage variable and are current on their debt repayments are offered a lower, fixed interest rate. This may alleviate some financial distress and thereby enable these customers to pay down their debt and remain financially stable. Also, for those customers whose balance has yet to reach the credit limit, the risk models in some embodiments may dictate reducing credit limits. This may also mitigate any future write-off that may result from a default. Further, the risk models may dictate that the financial institution offer credit-protection products, such as insurance, to some of those customers whose accounts have been assigned a credit-usage variable. In addition to mitigating write-offs, the aforementioned prophylactic credit treatments will often protect customers' credit ratings.

Furthermore, the financial institution can use the present invention to increase revenue by tailoring services, products, and offerings for each of its customers based on information gleaned from the respective time-series analyses. For example, to increase revenue, some embodiments of the present invention incorporate accounts having credit-usage variables, which represent different credit-usage patterns, into revenue models. For example, some credit-usage variables may indicate that a customer was able to reduce its balance and regain spending power after a trigger spend. This demonstrates good management of revolving credit. Accordingly, some embodiments of the present invention predicts that this customer is a good candidate for an increased credit line or other relationship-building offers.

In some embodiments, a system is provided that comprises a database for storing transaction data taken from a plurality of revolving-credit accounts, wherein, for each revolving credit-account, the transaction data comprises: a credit-limit amount; a spend amount for each month; and a balance amount for each month. The system further comprise a processor associated with the database and configured to execute a credit-usage application for evaluating a customer's ability to manage revolving credit, wherein the credit-usage application executed by the processor is configured to: review the transaction data of each revolving credit-account to determine whether a trigger spend occurred; for each of the revolving credit-accounts in which a trigger spend occurred, review the spend amount for each month subsequent to the trigger spend; for each of the revolving credit-accounts in which a trigger spend occurred, review the balance amount for each month subsequent to the trigger spend; and identify those revolving credit-accounts in which the balance amount increases and the spend amount decreases in the months subsequent to the trigger spend.

In some embodiments, a method is provided that comprises the step of receiving transaction data taken from a plurality of revolving-credit accounts, wherein, for each revolving credit-account, the transaction data comprises: a credit-limit amount; a spend amount for each month; and a balance amount for each month. The method further includes the step of using a processor to evaluate a customer's ability to manage revolving credit by: reviewing the transaction data of each revolving credit-account to determine whether a trigger spend occurred; for each of the revolving credit-accounts in which a trigger spend occurred, reviewing the spend amount for each month subsequent to the trigger spend; for each of the revolving credit-accounts in which a trigger spend occurred, reviewing the balance amount for each month subsequent to the trigger spend; and identifying those revolving credit-accounts in which the balance amount increases and the spend amount decreases in the months subsequent to the trigger spend.

In some embodiments, a system is provided that comprises a database for storing transaction data taken from a plurality of revolving-credit accounts, wherein, for each revolving credit-account, the transaction data comprises: a credit-limit amount; a spend amount for each month; and a balance amount for each month. The system further comprises a processor associated with the database and configured to execute a pattern-detection application for detecting a credit-usage pattern in the transaction data, wherein the pattern-detection application executed by the processor is configured to: review the transaction data of each revolving credit-account to determine whether a trigger spend occurred; for each of the revolving credit-accounts in which a trigger spend occurred, align the transaction data relative to the trigger spend, conduct a time-series analysis on the aligned transaction data to detect credit-usage patterns. According to these embodiments, the pattern-detection application executed by the processor is configured to conduct the time-series analysis by: for each of the revolving credit-accounts in which a trigger spend occurred, reviewing the spend amount for each month subsequent to the trigger spend; and for each of the revolving credit-accounts in which a trigger spend occurred, reviewing the balance amount for each month subsequent to the trigger spend. Also, according to these embodiments, the pattern-detection application executed by the processor is further configured to identify those revolving credit-accounts in which the balance amount increases and the spend amount decreases in the months subsequent to the trigger spend.

In some embodiments, a computer program product is provided for evaluating a consumer's ability to manage revolving credit, the computer program product comprises a computer-readable medium having computer-readable program instructions stored therein, wherein the computer-readable program instructions comprise: first instructions configured to receive transaction data taken from a plurality of revolving-credit accounts, wherein, for each revolving credit-account, the transaction data comprises: a credit-limit amount; a spend amount for each month; and a balance amount for each month. The computer program product further comprises: second instructions configured to review the transaction data of each revolving credit-account to determine whether a trigger spend occurred; third instructions configured to review the spend amount for each month subsequent to the trigger spend, wherein the third instructions are configured to execute this review for each of the revolving credit-accounts in which a trigger spend occurred; fourth instructions configured to review the balance amount for each month subsequent to the trigger spend, wherein the fourth instructions are configured to execute this review for each of the revolving credit-accounts in which a trigger spend occurred; and fifth instructions configured to identify those revolving credit-accounts in which the balance amount increases and the spend amount decreases in the months subsequent to the trigger spend.

BRIEF DESCRIPTION OF THE DRAWINGS

Figure 1:
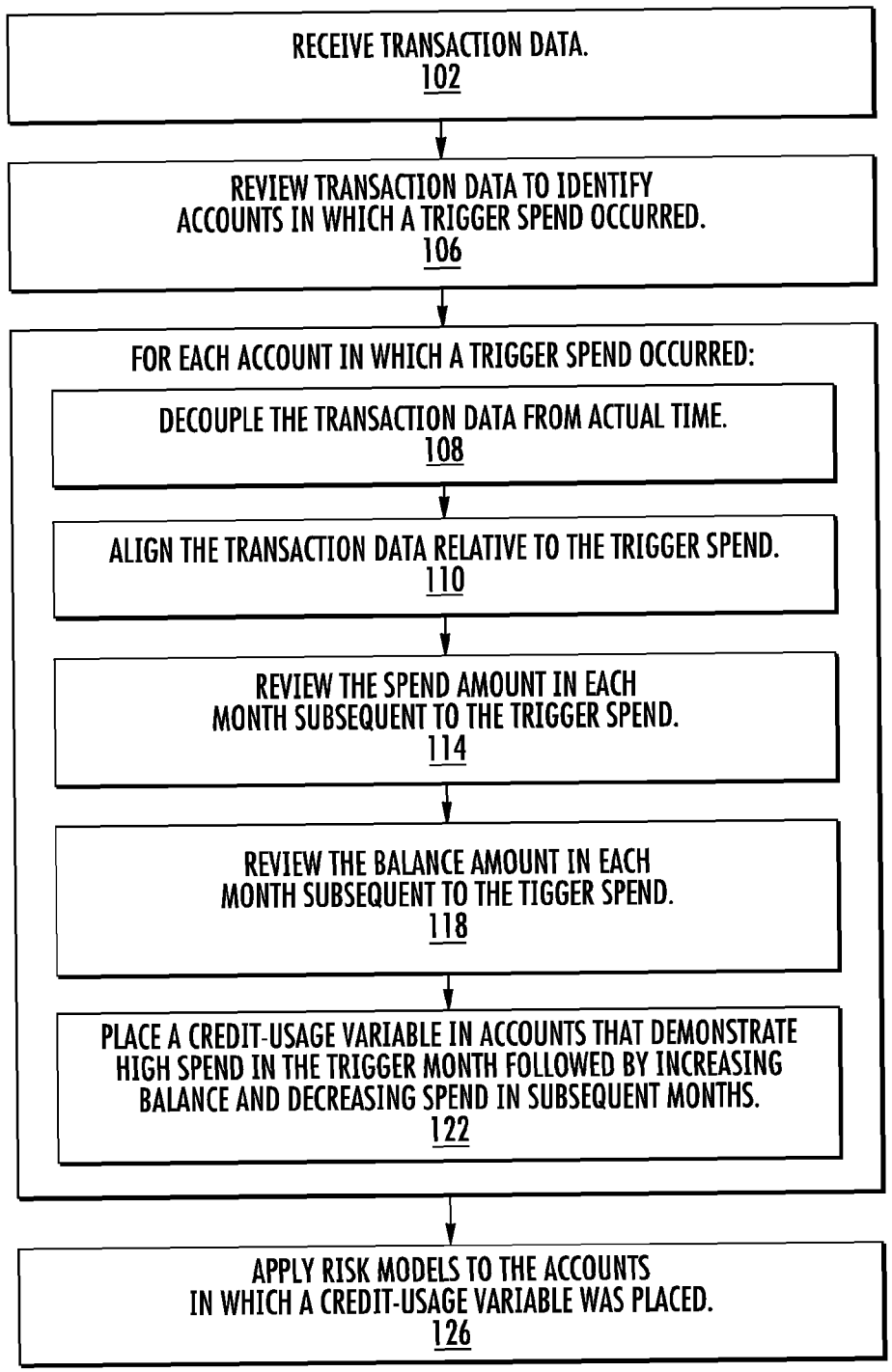
Figure 2:
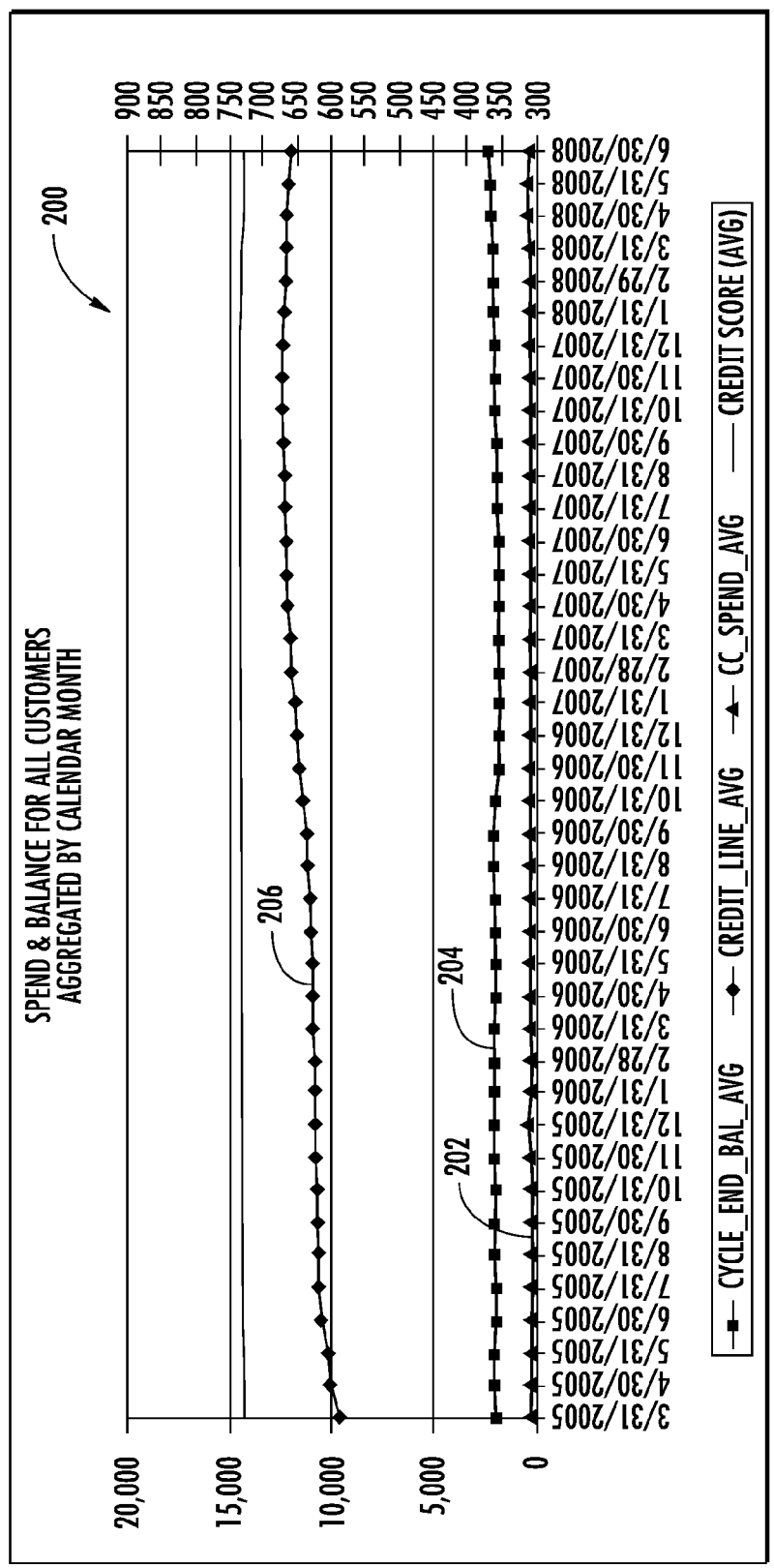
Figure 3:
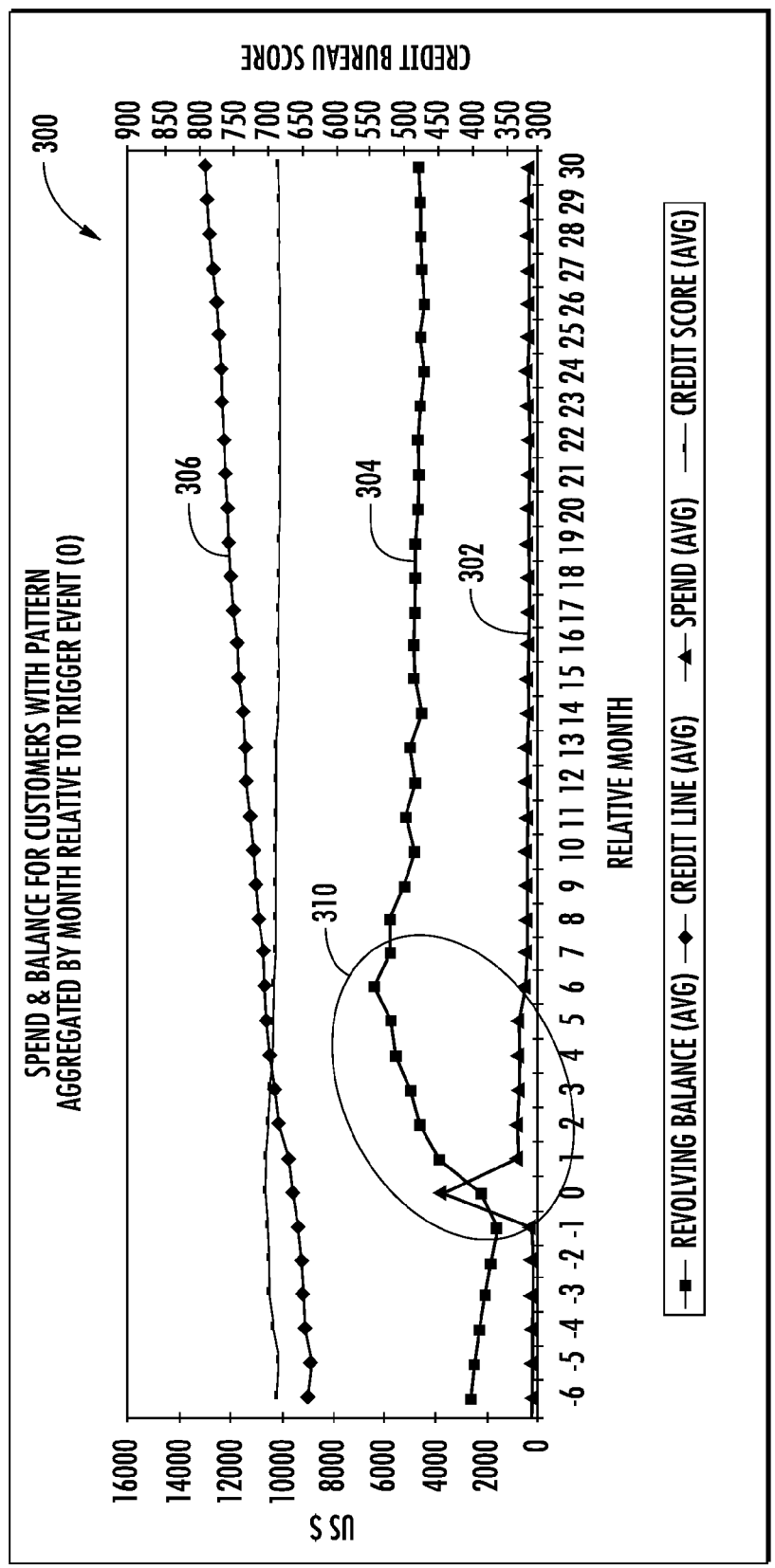
Figure 4:
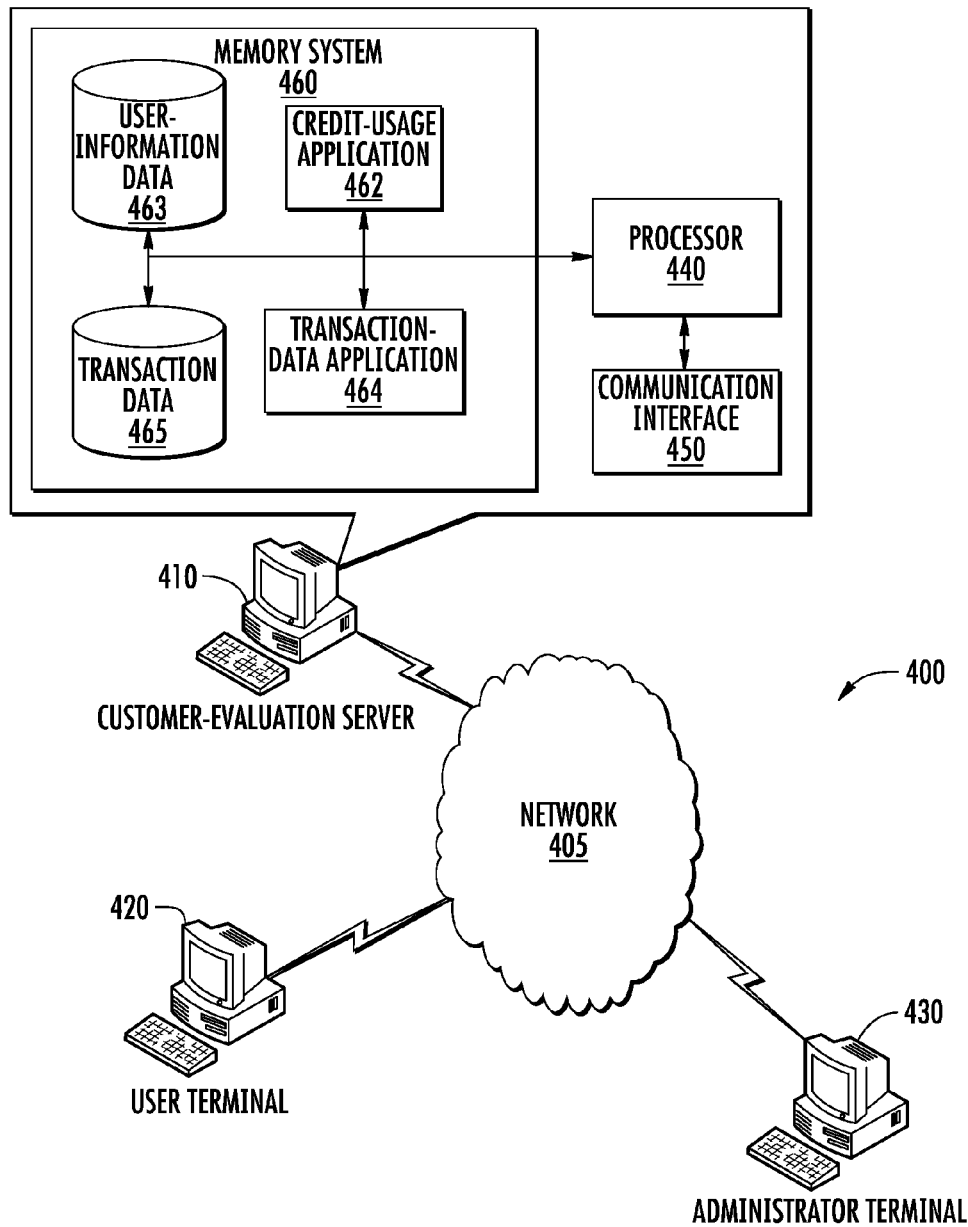

Having thus described embodiments of the invention in general terms, reference will now be made to the accompanying drawings wherein:

FIG. 1 is a flow chart illustrating an exemplary process of evaluating an individual customer's ability to manage revolving credit, according to an embodiment of the present invention;

FIG. 2 is an exemplary chart that graphs aggregated transaction data taken from all customers' accounts relative to the actual calendar month in which the transactions underlying the data occurred, according to an embodiment of the present invention;

FIG. 3 is an exemplary chart that graphs transaction data taken from accounts in which a trigger spend occurred relative to the respective accounts' trigger month, according to an embodiment of the present invention; and FIG. 4 illustrates an environment in which the processes described herein are implemented, according to an embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 provides a flow diagram illustrating an exemplary process 100 for: reviewing aggregated transaction data taken from a large number of revolving-credit accounts; detecting credit-usage patterns at an individual customer level; and applying the detected credit-usage patterns in risk models to evaluate individual customers' ability to manage revolving credit. As represented by block 102, the process 100 generally begins with receiving an institution's transaction data. For illustrative convenience, embodiments of the present invention will be described herein as being applied in a financial institution to evaluate individual customers' ability to manage revolving credit based on transaction data taken from the financial institution's revolving-credit accounts.

It should be appreciated, however, that other embodiments of the present invention could be applied in any institution or business, or non-business entity or portion thereof, to evaluate the behavior of individuals or groups of individuals associated therewith. For purposes of this illustration, transaction data is collected at the customer level and includes customers' revolving-credit account information, such as each customer's historical monthly spend and balance data. "Spend", as used herein, refers to a customer's monthly purchases and/or cash advances. "Balance", as used herein, refers to a customer's monthly total outstanding balance.

As represented by block 106, the process 100 further involves reviewing the transaction data from all of the accounts to identify which accounts experienced a "trigger spend." The term "trigger spend" as used herein refers to a situation where a customer's spend in a single month exceeds a percentage of the account's credit line. For convenience, the month in which a customer's trigger spend occurs is referred to herein as the customer's "trigger month." According to some embodiments, a trigger spend occurs in an account when the customer's spend using the account is greater than twenty percent of the account's credit line and over $100.

For the accounts in which a trigger spend occurred, the process 100 involves decoupling the customers' transaction data from actual time, as represented by block 108. Then, as represented by block 110, the process 100 involves shifting each identified account's transaction data so as to align the transaction data relative to the respective customers' trigger month. It should be appreciated that the transaction data is maintained in successive monthly order, even after it is shifted. For example, in the event a first customer's trigger month is April 2007 and a second customer's trigger month is February 2008, the process 100 involves decoupling (block 108) both customers' transaction data from actual time. Then the process 100 involves shifting both customers' transaction data in time-series order so as to align (block 110) April 2007 of the first customer's account and February 2008 of the second customer's account.

Because the customers' transaction data is aligned relative to the trigger month—instead of actual time—patterns related to the customers' trigger spends can be identified, even if the patterns occur in different months. These patterns would be masked if the transaction data were aligned relative to actual time. This concept is illustrated with reference to FIGS. 2 and 3. Chart 200 of FIG. 2 presents transaction data taken from all customers' accounts and aggregated in successive months relative to actual time. Line 202 is a time-spend line that represents customers' average monthly spend amount, line 204 is a time-balance line that represents customers' average monthly balance amount, and line 206 is a time-limit line that represents customers' average credit-limit amount. As indicated by the straight time-spend and time-balance lines 202, 204, customers' average spend and average balance remain constant from month to month. Accordingly, any balance-and-spend patterns occurring at the individual account level are masked when customers' transaction data is aggregated relative to actual time, as represented in chart 200.

On the other hand, with reference to chart 300 of FIG. 3, balance-and-spend patterns at the individual account level emerge when transaction data taken from accounts in which a trigger spend occurred is time-shifted and then aggregated relative to the trigger month. Line 302 is a time-spend line that represents customers' average monthly spend amount, line 304 is a time-balance line that represents customers' average monthly balance amount, and line 306 is a time-limit line that represents customers' average credit-limit amount. Here, transaction data, which is taken from accounts in which a trigger spend occurred, is aligned relative trigger month— instead of the actual month in which the behavior underlying the transaction data occurred. In chart 300, the month in which the trigger spend occurred is Relative Month 0. As such, the time-spend line 302 peaks at Relative Month 0.

Because the transaction data is arranged relative to the trigger spend, credit-usage patterns related to, or resulting from, the customers' trigger spends can be identified, even if the patterns occur in different months. One exemplary pattern identified in accounts in which a trigger spend occurred is characterized by high spend in the trigger month, followed by increasing balance and decreasing spend in subsequent months. This pattern is illustrated in chart 300. Specifically, as indicated by the segment of the time-spend line 302 located in the encircled area 310, customers' spend decreases in successive months subsequent to the trigger month. And, as indicated by the segment of the time-balance line 304 located in the encircled area 310, customers' balance increases in successive months subsequent to the trigger month. Historically, it has been shown that customers who exhibit this credit-usage pattern characterized by high spend in the trigger month followed by increasing balance and decreasing spend in subsequent months result in more write-offs than random customers.

Accordingly, after identifying this credit-usage pattern at an individual account level by shifting and aligning the transaction data, the process 100 then executes time-series analyses on the aligned transaction data at an individual account level to identify customers and/or a subset of customers that demonstrate this exemplary credit-usage pattern. For example, with reference to FIG. 1, to identify individual customers who demonstrate this pattern, the process 100 proceeds to block 114 where, for each account in which a trigger spend occurred, the customer's spend in the trigger month is compared to the customer's spend in subsequent months. And then, at block 118, for each customer, the customer's balance in the month immediately after the trigger month is compared to the customer's balance in subsequent months. For example, if a trigger spend occurred in Relative Month 0 of chart 300, then—the process 100, as indicated at block 118—compares the customer's balance in Relative Month 1 to the customer's balance in Relative Months 2, 3, 4, 5, 6, 7, etc.

Then, as indicated at block 122, the process 100 places a credit-usage variable in those accounts that demonstrate the exemplary credit-usage pattern characterized by high spend in the trigger month followed by increasing balance and decreasing spend in subsequent months. For example, the process 100 identifies accounts where Relative Month 7's balance is greater than Relative Month 1's, and where Relative Month 7's spend is less than Relative Month 0's, and then places a credit-usage variable in those identified accounts. According to some embodiments, the balance amount seven months after the trigger spend must be $500 or more before it can determined that the balance amount increased in the months subsequent to the trigger.

Then, as indicated at block 126, these identified accounts, which include a credit-usage variable, are applied in risk models such as portfolio, delinquency, and recovery models. The presence of the credit-usage variables serve to enhance the performance of these existing models. In turn, financial institutions can rely on these risk models to more effectively mitigate write-offs by identifying customers whose credit-usage pattern is characterized by high spend in trigger months, followed by decreasing spend and increasing balance in subsequent months, and proactively work with these customers to reduce financial distress and thereby prevent delinquencies and eventual write-offs.

For example, customers who exhibit this credit-usage pattern, but are current on their debt repayments, can be offered lower, fixed interest rates. This alleviates some of those customers' financial distress and thereby enables them to pay down their debt and remain financially stable. Also, for those customers whose balance has yet to reach their credit limit, the risk models may dictate reducing credit limits. This will mitigate any future write-off that may result from a default. Still yet, the risk models may dictate that the financial institution offer credit-protection products, such as insurance, to some of those customers whose accounts have been assigned a credit-usage variable. In addition to mitigating write-offs, the aforementioned prophylactic credit treatments protect customers' credit ratings.

Furthermore, it should be appreciated that the risk models enhanced with credit-usage variables can be used to increase revenue by recommending tailored services, products, and offerings for individual customers. For example, to increase revenue, other embodiments of the present invention incorporate accounts having credit-usage variables, which represent different credit-usage patterns, into revenue models. For example, some credit-usage variables may indicate that a customer was able to reduce its balance and regain spending power after a trigger spend. This demonstrates good management of revolving credit. Accordingly, one embodiment of the present invention predicts that this customer is a good candidate for an increased credit line or other relationship building offers.

FIG. 4 illustrates a computer-based customer-evaluation system 400 in which the process 100 may be implemented, according to one embodiment of the invention. As illustrated in FIG. 4, the customer-evaluation system 400 generally includes a customer-evaluation server 410 communicably coupled to one or more user terminals 420 and one or more administrator terminals 430 via a network 405. In one embodiment, the user and administrator terminals 420, 430 include personal computers or mobile terminals that communicate with the customer-evaluation server 410 using the Internet and a web browser application.

As further illustrated in FIG. 4, the customer-evaluation server 410 includes a processor 440 operatively coupled to a communication interface 450 and a memory system 460. The processor 440 executes the process 100 and graphically displays outputs on the graphical user interface of the user terminal 420. The communication interface 450 communicates information to and from the network 405 and, in some embodiments, to and from users and administrators. The memory system 460 may include any type of computer-readable medium for storing computer-executable instructions. The processor 440 is configured to execute the computer-executable instructions stored in the memory system 460 and, thereby, use the communication interface 450 to communicate information to and from the user and administrator terminals 420, 430 and store or retrieve information in the memory system 460.

In this regard, the memory system 460 includes a user-authentication application 462 having computer-executable instructions for authenticating users' and administrators' log-in information by cross-referencing that log-in information with user information stored in the user information database 463 when users and administrators attempt to sign in to the customer-evaluation system 400 via the user and administrator terminals 420, 430.

In an embodiment, the memory system 460 further includes a transaction-data application 464, which stores in and retrieves from a database 465 transaction data for all of the financial institution's customers. In an embodiment, the transaction-data application 464 enables users to manually search and view customers' transaction data.

It should be appreciated that the communication network 405 could be a wide area network, including the Internet, a local area network or intranet, a wireless network, etc. It should also be appreciated that when components are described herein as communicating over a network, the components may be directly coupled to each other, or indirectly coupled via one or more other components.

Furthermore, although the customer-evaluation system 400 is described herein as comprising separate components, these components need not be separate and distinct from one another, and two or more of such components may, in some embodiments, be combined into a single component that performs all of the functions of the multiple components so combined as described herein. For illustrative convenience, embodiments of the present invention are described herein where the user terminal 420 and the administrator terminal 430 constitute a part of the customer-evaluation system 400. It should be appreciated, however, that the customer-evaluation system 400 is not limited to a system that includes these components.

As will be appreciated by one of skill in the art, embodiments of the invention may include a method (including a business process), system, computer program product, or a combination of the foregoing. Accordingly, some embodiments of the present invention or portions thereof may even take the form of an entirely hardware embodiment, an entirely software embodiment (including firmware, resident software, micro-code, etc.), or an embodiment combining software and hardware aspects that may, in some instances, be referred to herein as a "system." Furthermore, embodiments of the present invention, or portions thereof, may take the form of a computer program product on a computer-readable medium having computer-usable program code embodied in the medium.

In such embodiments, any suitable computer-readable medium may be utilized. The computer-readable medium may be, for example but not limited to, an electronic, magnetic, optical, electromagnetic, infrared, or semiconductor system, apparatus, or device. More specific examples of the computer-readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer program code for carrying out operations of embodiments of the present invention may be written in an object-oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that at least some blocks of the flowchart illustrations and/or block diagrams, and/or combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system comprising:
a database for storing transaction data taken from a plurality of revolving-credit accounts, wherein, for each revolving credit-account, the transaction data comprises:
a credit-limit amount;
a spend amount for each month; and
a balance amount for each month;
a processor associated with the database and configured to execute a credit-usage application for evaluating a customer's ability to manage revolving credit;
wherein the credit-usage application executed by the processor is configured to:
review the transaction data of each revolving credit-account to determine whether a trigger spend occurred;
for each of the revolving credit-accounts in which a trigger spend occurred, review the spend amount for each month subsequent to the trigger spend;
for each of the revolving credit-accounts in which a trigger spend occurred, review the balance amount for each month subsequent to the trigger spend;
identify those revolving credit-accounts in which the balance amount increases and the spend amount decreases in the months subsequent to the trigger spend; and
determine that a revolving-credit account's balance amount increased in the months subsequent to the trigger spend, if the balance amount seven months after the trigger spend is greater than the balance amount one month after the trigger spend.

2. The system of claim 1, wherein the credit-limit is the amount of credit extended by an institution.

3. The system of claim 2, wherein the spend amount is a total value of purchases and cash advances charged to the revolving-credit account.

4. The system of claim 3, wherein the balance amount is a total outstanding balance on the revolving-credit account.

5. The system of claim 4, wherein a trigger spend occurs when a revolving-credit account's spend amount for one month equals or exceeds a percentage of the credit-limit amount.

6. The system of claim 4, wherein a trigger spend occurs when a revolving-credit account's spend amount for one month is more than $100, and equals or exceeds a percentage of the credit-limit amount.

7. The system of claim 6, wherein the balance amount seven months after the trigger spend must be $500 or more before the credit-usage application can determine that the balance amount increased in the months subsequent to the trigger.

8. The system of claim 5, wherein the credit-usage application executed by the processor is configured to determine that a revolving-credit account's spend amount decreased in the months subsequent to the trigger spend, if the spend amount seven months after the trigger spend is less than the spend amount in the month that the trigger spend occurred.

9. The system of claim 1, wherein the credit-usage application executed by the processor is further configured to:
assign a credit-usage variable to those revolving-credit accounts in which the balance amount increases and the spend amount decreases in the months subsequent to a trigger spend.

10. The system of claim 9, wherein the processor is further configured to execute a risk-model application for evaluating those accounts to which a credit-usage variable was assigned to determine the customer's ability to manage revolving credit.

11. The system of claim 10, wherein the processor executing the risk-model application recommends offering those customers whose revolving-credit account was assigned a credit-usage variable a fixed interest rate on the balance.

12. The system of claim 10, wherein the processor executing the risk-model application recommends reducing the credit-limit amount for those customers whose revolving-credit account was assigned a credit-usage variable.

13. A method comprising:
receiving transaction data taken from a plurality of revolving-credit accounts, wherein, for each revolving credit-account, the transaction data comprises:
a credit-limit amount;
a spend amount for each month; and
a balance amount for each month;
using a processor to evaluate a customer's ability to manage revolving credit by:
reviewing the transaction data of each revolving credit-account to determine whether a trigger spend occurred;
for each of the revolving credit-accounts in which a trigger spend occurred, reviewing the spend amount for each month subsequent to the trigger spend;
for each of the revolving credit-accounts in which a trigger spend occurred, reviewing the balance amount for each month subsequent to the trigger spend; and
identifying those revolving credit-accounts in which the balance amount increases and the spend amount decreases in the months subsequent to the trigger spend; and
determine that a revolving-credit account's balance amount increased in the months subsequent to the trigger spend, if the balance amount seven months after the trigger spend is greater than the balance amount one month after the trigger spend.

14. The method of claim 13, wherein the credit-limit is the amount of credit extended by an institution.

15. The method of claim 14, wherein the spend amount is a total value of purchases and cash advances charged to the revolving-credit account.

16. The method of claim 15, wherein the balance amount is a total outstanding balance on the revolving-credit account.

17. The method of claim 16, wherein a trigger spend occurs when a revolving-credit account's spend amount for one month equals or exceeds a percentage of the credit-limit amount.

18. The method of claim 17, wherein the credit-usage application executed by the processor is configured to determine that a revolving-credit account's spend amount decreased in the months subsequent to the trigger spend, if the spend amount seven months after the trigger spend is less than the spend amount in the month that the trigger spend occurred.

19. The method of claim 13, further comprising:
assigning a credit-usage variable to those revolving-credit accounts in which the balance amount increases and the spend amount decreases in the months subsequent to a trigger spend.

20. The method of claim 19, further comprising:
evaluating those accounts to which a credit-usage variable was assigned to determine the customer's ability to manage revolving credit.

21. The method of claim 20, further comprising:
offering those customers whose revolving-credit account was assigned a credit-usage variable a fixed interest rate on the balance.

22. A computer program product configured to evaluate a consumer's ability to manage revolving credit, the computer program product comprising a non-transitory computer-readable medium having computer-readable program instructions stored therein, wherein the computer-readable program instructions comprise:
first instructions configured to receive transaction data taken from a plurality of revolving-credit accounts, wherein, for each revolving credit-account, the transaction data comprises:
a credit-limit amount;
a spend amount for each month; and
a balance amount for each month;
second instructions configured to review the transaction data of each revolving credit-account to determine whether a trigger spend occurred;
third instructions configured to review the spend amount for each month subsequent to the trigger spend, wherein the third instructions are configured to execute this review for each of the revolving credit-accounts in which a trigger spend occurred;
fourth instructions configured to review the balance amount for each month subsequent to the trigger spend, wherein the fourth instructions are configured to execute this review for each of the revolving credit-accounts in which a trigger spend occurred; and
fifth instructions configured to identify those revolving credit-accounts in which the balance amount increases and the spend amount decreases in the months subsequent to the trigger spend
sixth instructions configured to determine that a revolving-credit account's balance amount increased in the months subsequent to the trigger spend, if the balance amount seven months after the trigger spend is greater than the balance amount one month after the trigger spend.

23. The computer program product of claim 22, wherein the credit-limit is the amount of credit extended by an institution.

24. The computer program product of claim 23, wherein the spend amount is a total value of purchases and cash advances charged to the revolving-credit account.

25. The computer program product of claim 24, wherein the balance amount is a total outstanding balance on the revolving-credit account.

26. The computer program product of claim 25, wherein a trigger spend occurs when a revolving-credit account's spend amount for one month equals or exceeds a percentage of the credit-limit amount.

* * * * *